(12) United States Patent
Blessing et al.

(10) Patent No.: US 6,860,305 B2
(45) Date of Patent: Mar. 1, 2005

(54) TRUCK TRACK

(76) Inventors: Chris A. Blessing, 1799 Pineview Rd., Dugspur, VA (US) 24325; Randall Gene Moore, 84 Panther Creek Rd., Dugspur, VA (US) 24325

(*) Notice: Subject to any disclaimer, the term of this patent is extended or adjusted under 35 U.S.C. 154(b) by 0 days.

(21) Appl. No.: 10/413,529

(22) Filed: Apr. 15, 2003

(65) Prior Publication Data

US 2004/0206435 A1 Oct. 21, 2004

(51) Int. Cl.[7] .................... B60C 11/00; B60C 27/00
(52) U.S. Cl. .............. 152/223; 152/220; 152/228
(58) Field of Search .................... 152/185.1, 187, 152/189, 213 R, 218, 220, 223, 217, 170, 174, 186, 225 R, 226–228; 301/41.1, 44.1, 44.3, 44.4, 52; 411/21, 924

(56) References Cited

U.S. PATENT DOCUMENTS

| | | | |
|---|---|---|---|
| 1,600,588 A | * | 9/1926 | Hipkins ............... 152/220 |
| 1,719,746 A | * | 7/1929 | Baker ................. 152/222 |
| 2,066,412 A | * | 1/1937 | Meckler .............. 152/227 |
| 2,222,786 A | | 11/1940 | Snyder |
| 2,311,116 A | | 2/1943 | Lau |
| 2,947,337 A | | 8/1960 | Ambeau |
| 3,696,852 A | | 10/1972 | Oulman |
| 3,974,871 A | | 8/1976 | Muller et al. |
| 4,142,808 A | * | 3/1979 | Muller et al. .......... 152/217 |
| 4,243,088 A | * | 1/1981 | Labonville ........... 152/223 |
| 4,357,975 A | * | 11/1982 | Baldry ............... 152/223 |
| 4,402,357 A | * | 9/1983 | Granryd ............. 152/216 |
| 4,408,646 A | | 10/1983 | Forsyth |
| 4,690,190 A | * | 9/1987 | Jeindl ............... 152/213 A |
| 4,886,100 A | | 12/1989 | Parker, III |
| 6,085,816 A | | 7/2000 | Clark et al. |

* cited by examiner

Primary Examiner—Russell D. Stormer
Assistant Examiner—Jason R. Bellinger
(74) Attorney, Agent, or Firm—Richard C. Litman

(57) ABSTRACT

An anti-skid device especially adapted for trucks of the dual wheel type. In its preferred embodiment, the device is provided with a cleat(s) that protrudes two inches from the surface of the tire. The device is designed to be disposed across both wheels of dual-wheeled vehicles. A plate is provided at the end of the device, which plate abuts the sidewall of the inside tire and functions to prevent the device from moving. A unique chain, hook and bolt assembly is utilized to attach the device to the tire.

6 Claims, 7 Drawing Sheets

TRUCK TRACK

BACKGROUND OF THE INVENTION

1. Field of the Invention

The present invention generally relates to anti-skid devices. More specifically, the present invention is drawn to a device that can be attached to the tires of motor vehicles (especially vehicles having dual tires), which device functions to enhance the gripping efficiency of the tires in off-road conditions.

2. Description of the Related Art

There are many truckers (power, telephone, loggers, farmers, etc.) who often must drive in off-road environments. Such environments often present surfaces that are hostile to driving stability. Besides causing the vehicle to become stuck or to slide; muddy, snowy, icy, or loose driving surfaces can create perilous conditions. A device that is inexpensive, rugged, efficient, and can be easily and quickly attached to the tires of a vehicle, would certainly be a welcome addition to the art.

There are many types of anti-skid devices available in the market place. For example, U.S. Pat. No. 2,222,786 issued to Snyder, U.S. Pat. No. 3,974,871 issued to Muller et al. and U.S. Pat. No. 6,085,816 issued to Clark et al. show chains for enhancing the gripping ability tires. Chains are notoriously difficult to put on and are susceptible to cause damage if incorrectly mounted.

U.S. Pat. No. 2,311,116 issued to Lau is drawn to non-skid shoes adapted for mounting on automobile tires. Though effective on slippery pavement, the shoes would not withstand the rigors of rugged off-road terrain.

U.S. Pat. No. 3,696,852 issued to Oulman is drawn to a plurality of traction devices for flexing tires. The devices are not constructed with extended cleats.

U.S. Pat. No. 4,886,100 issued to Parker III describes a device comprising hooks that are mounted on the driving wheel tire. The hooks are not of a size to accommodate dual tires.

U.S. Pat. No. 4,408,646 issued to Forsyth discloses a track structure that encases the tread of a tire. The patentee does not contemplate mounting the track on dual wheels.

U.S. Pat. No. 2,947,337 issued to Ambeau shows a cleat device spanning dual tires. The device shows only a pair of chains to secure the device on the tires.

None of the above inventions and patents, taken either singly or in combination, is seen to disclose a rugged, surface-gripping device as will be subsequently described and claimed in the instant invention.

SUMMARY OF THE INVENTION

The instant invention is drawn to a device for enhancing traction that is especially adapted for trucks of the dual wheel type. In its preferred embodiment, the device is provided with a cleat(s) that protrudes as much as two inches from the surface of the tire. The device is designed to span both tires of dual-wheeled vehicles. A plate is provided at the end of the device, which plate abuts the sidewall of the inside tire and functions to prevent the device from moving. A unique chain, hook and bolt assembly is utilized to attach the device to the tire. Additional embodiments are drawn to a device that is designed to span only a single tire.

The tracks are designed to be easily attached even if the wheel is mired in mud. Two inch cleats provide bulldozer-like traction allowing the vehicle traverse areas that are otherwise inaccessible to dual-wheeled trucks. Though not shown, a ratchet strap can be used in lieu of chains if it is necessary to protect aluminum wheels.

Accordingly, it is a principal object of the invention to provide a device for enhancing tire traction of an automotive vehicle.

It is another object of the invention to provide a device for enhancing tire traction, which device is efficient to enhance traction in extreme off-road environments.

It is a further object of the invention to provide a device for enhancing tire traction, which device is easy to mount and remove.

Still another object of the invention is to provide a device for enhancing tire traction, which device is especially adapted to dual-wheeled vehicles.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
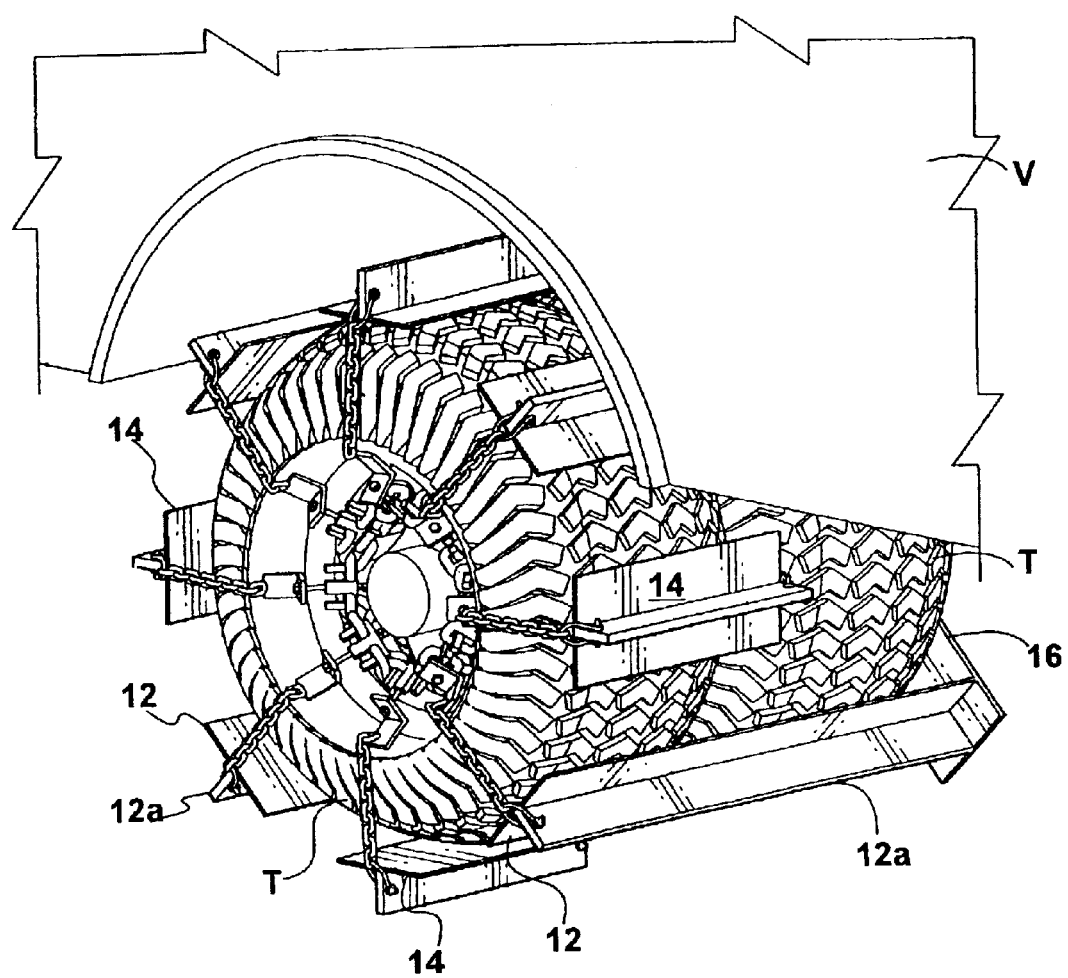
FIG. 1 is an environmental, perspective view of a truck track according to the present invention.

Attention is first directed to FIG. 1 wherein an array of truck tracks 12 and 14 is mounted on the tires T of a dual wheeled vehicle V. The preferred track embodiment 12 is adapted to span both tires of the vehicle. A second embodiment 14 is designed to span only a single tire.

Figure 2:
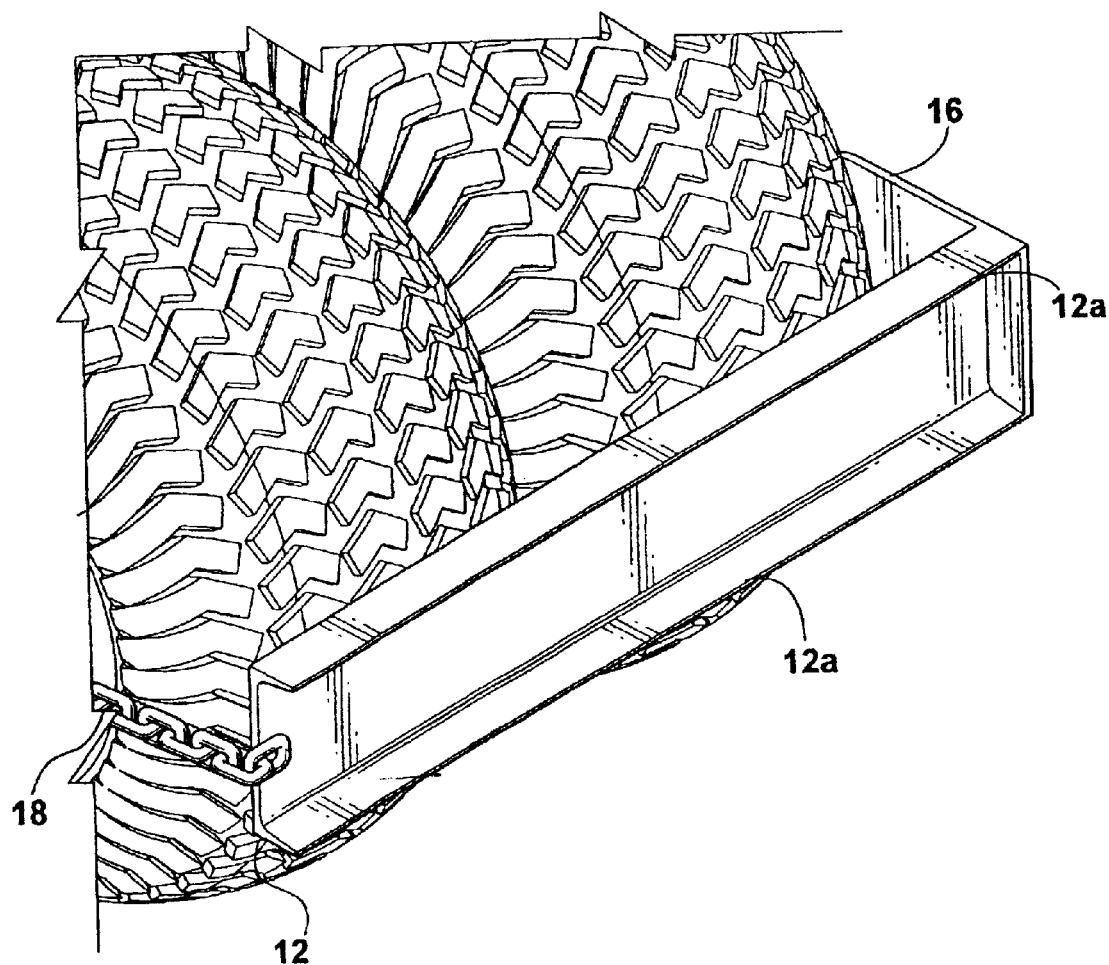
FIG. 2 is an environmental, perspective view of a first embodiment of a truck track according to the present invention.
Figure 3:
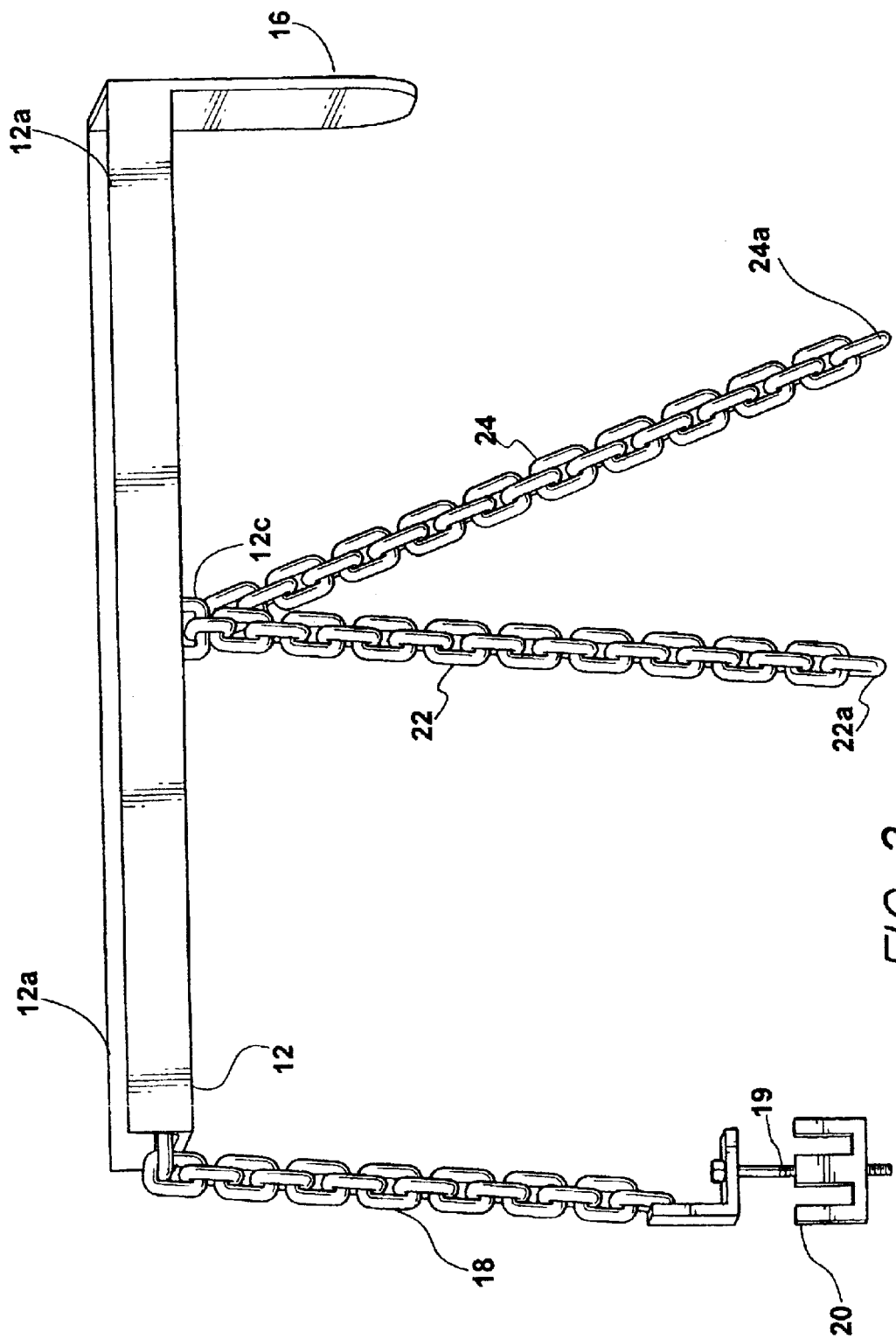
FIG. 3 is a perspective view of a first embodiment of a truck track according to the present invention.

The truck track 12 can be fabricated from a T-bar (FIG. 1) or c-channel bar (FIG. 2) steel stock. Track 12 is provided with cleats 12a that protrude perpendicularly approximately two inches from the base of the track. As best seen in FIG. 3, a distal end of the track is provided with a plate 16, which plate extends perpendicularly approximately four inches from the base of the track in a direction opposite to that of cleats 12a. A chain 18 is affixed at one end to the proximate end of the track. At its other end, chain 18 terminates in a slotted hook 20. Slotted hook 20 can be adjustably positioned on a threaded bolt 19. Second and third chains 22, 24 have ends anchored to the track at a center portion 12c thereof. The other ends 22a, 24a of chains 22, 24 are free ends.

Figure 4:
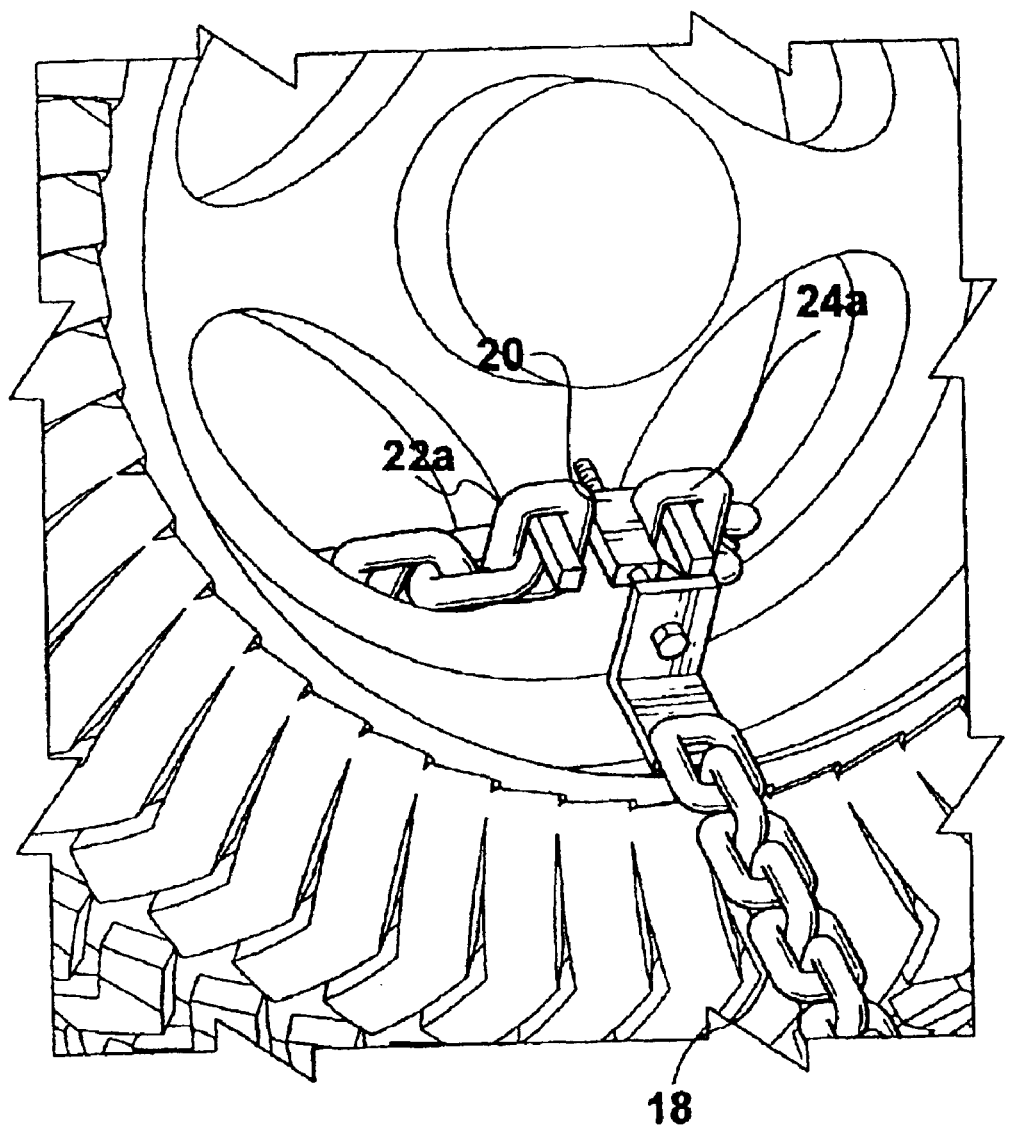
FIG. 4 is a partial, perspective view of a hook and chain arrangement of a truck track according to the present invention.

The track 12 can be quickly and easily attached to the tires of a dual tire vehicle. As shown FIGS. 1 and 2, the face of the track is placed against the surfaces of the tire so that the plate 16 extends along the inside wall of the inside tire. As best seen in FIG. 4, chain 18 is positioned to extend around the outside wall of the outside tire so that slotted hook 20 is disposed on the rim of the tire. The free ends 22a, 24a of chains 22, 24 are positioned so that they extend through openings in the rim of the outside tire, which free ends are then attached to slotted hook 20. The hook can be adjusted on bolt 19 to insure that the chains are tight. Plate 16 provides additional stability to prevent track movement.

Although steel stock is preferred for fabricating the track, it is obvious that any rugged material (aluminum, plastic, etc.) can be utilized if suited. In most instances four tracks per dual wheel would be sufficient. However, in very extreme conditions it may be necessary to augment the dual tire tracks 12 with a single tire tracks 14.

Figure 5:
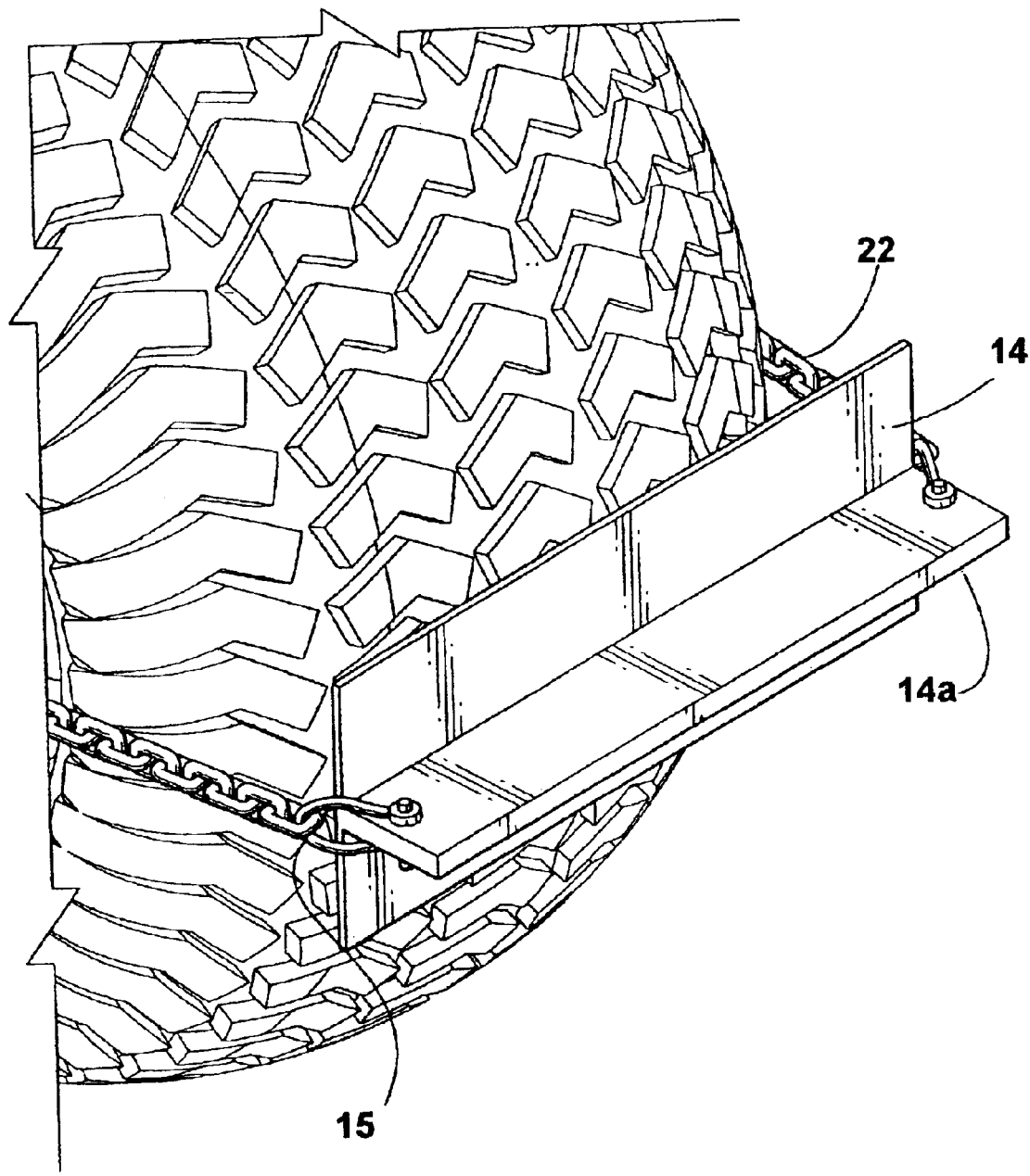
FIG. 5 is an environmental, perspective view of a second embodiment of a truck track according to the present invention.
Figure 6:
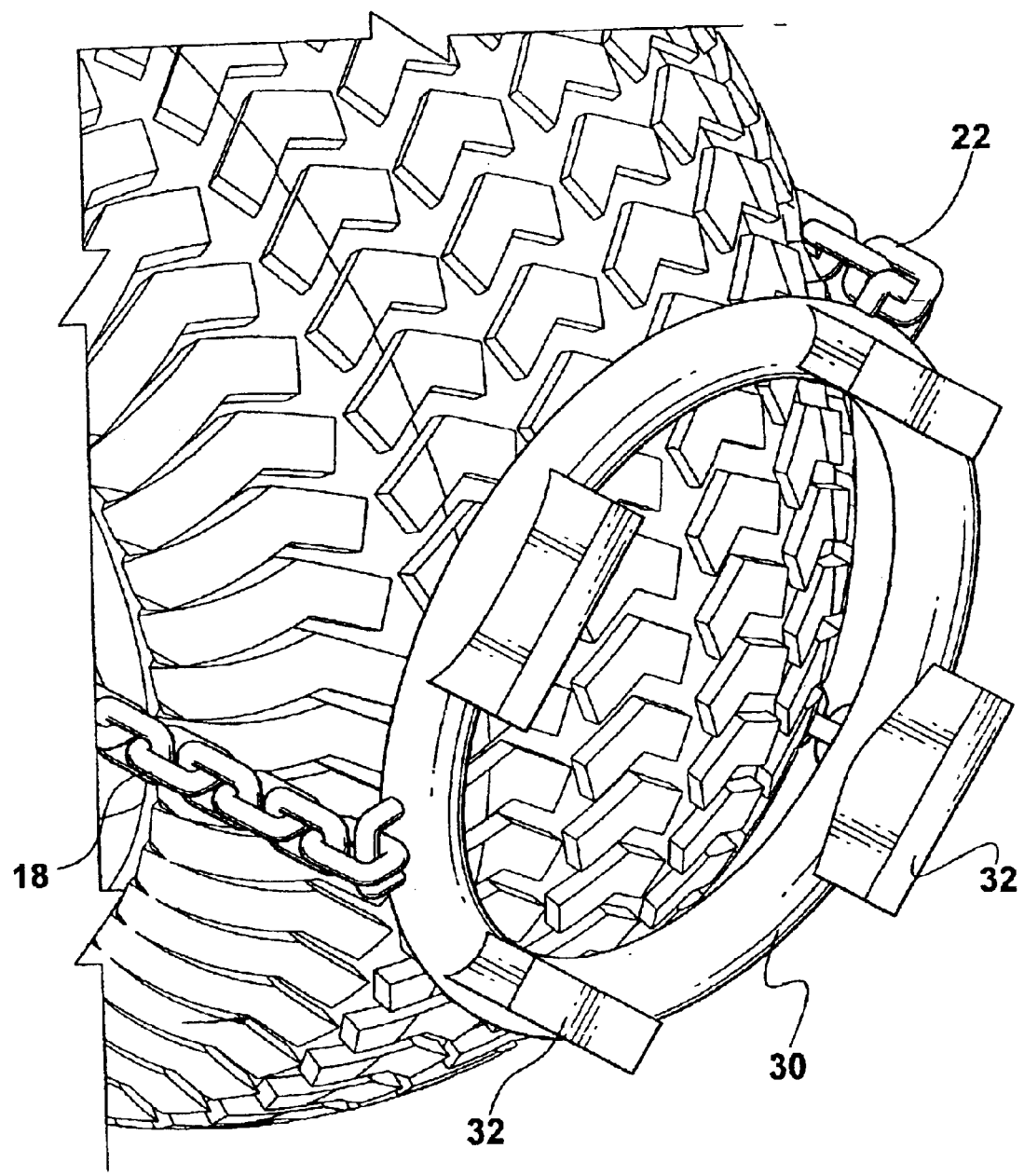
FIG. 6 is an environmental, perspective view of a third embodiment of a truck track according to the present invention.
Figure 7:
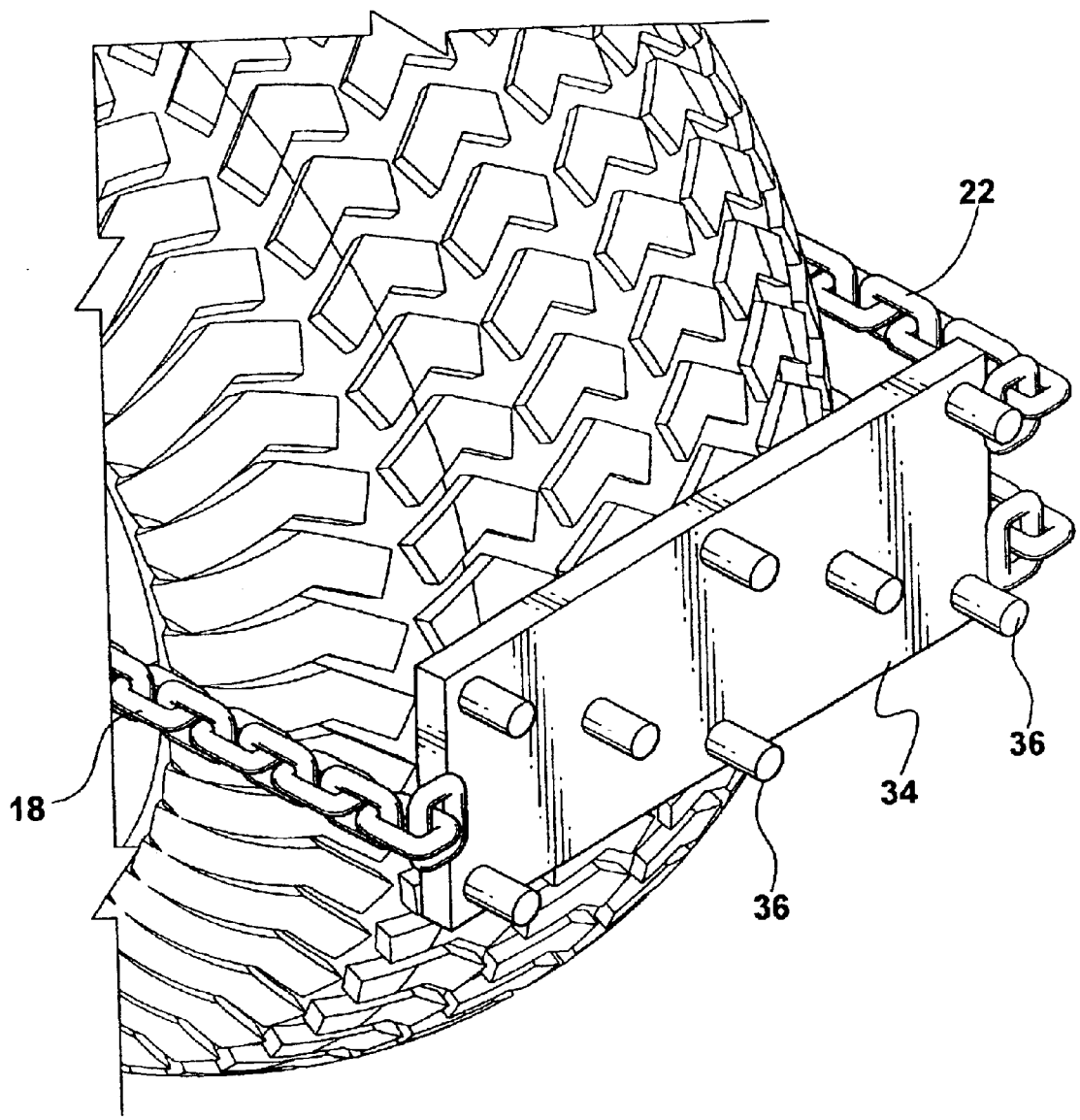
FIG. 7 is an environmental, perspective view of a fourth embodiment of a truck track according to the present invention.

As best seen in FIG. 5, track 14 comprises a base member having a cleat 14a that protrudes perpendicularly approximately two inches from the base of the track. Chains 18 and 22 are attached at opposite ends of track 14. As indicated above chain 18 terminates in a slotted hook and chain 22 terminates in a free end, which free end is adapted to be inserted in the slotted hook. Variants of the single tire track are illustrated in FIGS. 6 and 7. In FIG. 6 the base 30 is ring-shaped and the cleats 32 are positioned on the circumference of the base. In FIG. 7 base 34 is configured as a rectangular plate and cleats 36 take on the form of pegs extending perpendicularly from the face of the plate.

It is to be understood that the present invention is not limited to the embodiments described above, but encompasses any and all embodiments within the scope of the following claims.

We claim:

1. A traction enhancing device for a dual tire motor vehicle comprising:
    a rigid body member, said body member having a planar front face, a planar rear face, a first end and a second end;
    at least one cleat disposed on said front face and extended perpendicularly therefrom;
    a first chain, said first chain having a proximate end and a distal end, said proximate end being attached to said first end of said body member;
    said body member further having a central portion on the rear face and including second and third chains, said second and third chains having first ends and second ends, the first ends anchored at the central portion on the rear face and the second ends terminating as free ends;
    a slotted hook, said slotted hook adjustably mounted on a threaded bolt, said threaded bolt being attached to said distal end of said first chain.

2. A traction enhancing device as recited in claim 1 further including a plate member, said plate member affixed to said second end of said body member and extended perpendicularly therefrom in a direction opposite to that of said at least one cleat member.

3. A traction enhancing device as recited in claim 2, wherein there are two cleats disposed on said front face.

4. A traction enhancing device for a dual-tire motor vehicle comprising:
    a rigid body member, said body member having a planar front face, a planar rear face, a first end and a second end, wherein said body member spans said dual-tire;
    at least one cleat disposed on said front face and extending two inches perpendicularly therefrom;
    a first chain, said first chain having a proximate end and a distal end, said proximate end being attached to said first end of said body member;
    said body member further having a central portion on the rear face and including second and third chains, said second and third chains having first ends and second ends, the first ends anchored at the central portion on the rear face and the second ends terminating as free ends;
    a slotted hook, said slotted hook adjustably mounted on a threaded bolt, said threaded bolt being attached to said distal end of said first chain.

5. A traction enhancing device as recited in claim 4 further including a plate member, said plate member affixed to said second end of said body member and extended four inches perpendicularly therefrom in a direction opposite to that of said at least one cleat member.

6. A traction enhancing device as recited in claim 5, wherein there are two cleats disposed on said front face.

* * * * *